United States Patent [19]

Martin

[11] Patent Number: 4,705,839

[45] Date of Patent: Nov. 10, 1987

[54] URETHANE NONAQUEOUS DISPERSION FOR AUTOMOTIVE BASE COAT/CLEAR COAT APPLICATIONS

[75] Inventor: Glenn E. Martin, Farmington Hills, Mich.

[73] Assignee: BASF Corporation, Inmont Division, Clifton, N.J.

[21] Appl. No.: 32,892

[22] Filed: Mar. 31, 1987

[51] Int. Cl.$^4$ ............................................. C08G 18/32
[52] U.S. Cl. ...................................................... 528/49
[58] Field of Search ........................................ 528/49

[56] References Cited

U.S. PATENT DOCUMENTS 4,619,955 10/1986 Druetzler .............................. 528/49

Primary Examiner—Maurice J. Welsh
Attorney, Agent, or Firm—M. R. Chipaloski

[57] ABSTRACT

The present invention discloses a nonaqueous dispersion of urethane copolymers dispersed in a solvent which is less polar than the urethane copolymer segment wherein the urethane copolymers are the reaction products of a stabilizer, an aliphatic polyol and diisocyanates. Also disclosed is a method for making the nonaqueous polyurethane dispersions.

4 Claims, No Drawings

URETHANE NONAQUEOUS DISPERSION FOR AUTOMOTIVE BASE COAT/CLEAR COAT APPLICATIONS

DESCRIPTION

1. Technical Field

The present invention pertains to nonaqueous dispersions particularly those nonaqueous dispersions useful in automotive finishing procsesses.

2. Background Art

Due to the increase in costs and regulatory controls which have been placed on organic solvents, the paint industry has been trying to reduce the use of these materials in their products. One method has been to increase the solids content of the coating solution, but unfortunately, the resulting coatings fall short of industry standards. One particular problem has been the inability to develop a high solids coating which will result in the proper metal orientation of the metal flakes dispersed throughout the coating, without the use of expensive rheology control agents. These metal flakes are added to the base coat to enhance the mirrored finish and depth of the color. In addition, when the metal flakes are oriented in the proper direction, the brightness varies vis-a-vis the direction in which the light strikes it. These are highly desirable qualities in paint functions for the automobile industry. It has been found that through the addition of rheology control agents the metal orientation can be achieved in the higher solids base coats. However, this material added to the coat results in a loss in quality of the final base coat. These rheology control agents aid in orienting the metal particles such that the resulting coating has good aluminum control.

Therefore, what is needed in this art area is high solids (above 40% by weight) base coat polymer which will result in proper metal orientation to produce the desired finish, without the use of rheology control agents.

DISCLOSURE OF INVENTION

The present invention discloses a nonaqueous dispersion of urethane copolymers dispersed in a solvent which is less polar than the urethane copolymer segment, the urethane copolymers being the reaction product of a stabilizer, aliphatic polyols and diisocyanates. The particular stabilizers which are used to make these dispersions are the reaction products of a carboxylic acid and a monoepoxide.

Also disclosed is a method for making the nonaqueous dispersion wherein a stabilizer is prepared by reacting a carboxylic acid with a monoepoxide, then reacting this stabilizer with polyols and diisocyanates to form the nonaqueous dispersion urethane polymer which when dispersed in a solvent which is less polar than the urethane polymer segment to form the nonaqueous dispersion.

These base coats will allow for the production of base coat solutions which have higher solids content yet do not have the higher viscosity so often associated with the increase in polymeric content. This means that less organic solvents need to be used when preparing the base coat for application to the substrates and also that the proper metal orientation will be maintained without the use of the rheology reagents which are so often required when higher solids products are used, resulting in a superior finish which is less harmful to the environment and less costly to apply.

Other features and advantages of the present invention will become more apparent from the following detailed description of the preferred embodiment.

BEST MODE FOR CARRYING OUT THE INVENTION

The stabilizers which are useful in this invention are hydroxy functional reaction products of a carboxylic acid and a monoepoxide.

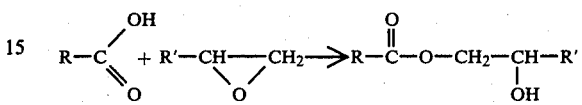

where R may be any alihatic, branched or straight chain constituent and R' may be any aliphatic constituent.

The carboxylic acid may be any aliphatic carboxylic acid commercially available or may be the result of the reaction between monofunctional alcohols and a cyclic anhydride.

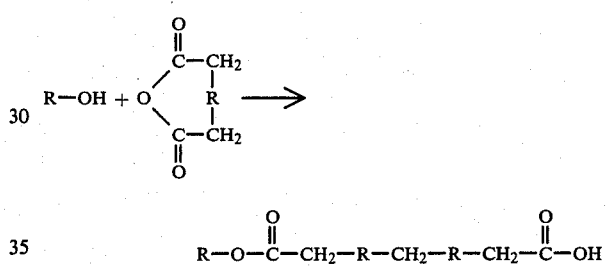

The monofunctional alcohol may be aromatic or aliphatic, straight chain or branched and may contain other functional groups which do not interfere with the formation of the carboxylic intermediate or its subsequent reaction with the monoepoxide. Examples of alcohols which may be used are methanol, ethanol, butanol, iso-butanol, benzyl alcohol, 2-ethylhexanol, propanol, iso-propanol and cyclohexanol.

The cyclic anhydrides used may be any anhydrides which will form a carboxylic acid when reacted with monofunctional alcohols, and may be aromatic, aliphatic, straight chain or branched. Typical anhydrides are maleic anhydride, phthalic anhydride, succinic anhydride, and glutaric anhydride.

The resulting carboxylic acid is then reacted with an aliphatic monoepoxide which may be straight chain or branched. Some commercially available epoxides which may be used are Cardura E ® epoxide which is a glycidyl ester of versatic acid and is available from the Shell Oil Company, and AZ Epoxy No. 8 ® epoxide which is a mixture of $C_{12}$–$C_{14}$ monoglycidyl ether from AZS Corporation in Atlanta, GA.

The reaction to form the hydroxyl functional stabilizer from these reactants is conventional and comprises a conventional stepwise addition reaction. In the case where the carboxylic acid is formed initially from the alcohol and the anhydride, the reactants are present in a molar relation of about 1:1, this is also the molar relationship of the reactants when the monoepoxide is reacted with the carboxylic acid.

Two examples of stabilizers which were prepared and were used in preparation of nonaqueous dispersions follow.

EXAMPLE I

To a reaction flask equipped with an agitator, thermometer, condenser and a nitrogen inlet tube, 114 grams of ethylene glycol monoethyl etheracetate, 65 gm of 2-ethylhexanol and 50 grams of succinic anhydride were added. The reaction mixture was heated to 145° C. and held until an acid number of about 122 is reached. At this time, 143 gm of AZ Epoxy No. 8 ® ($C_{12}$–$C_{14}$ monoglycidyl ether) was added along with 1.3 gm of benzyl dimethylamine. The batch was held again at a temperature of 145° C., until an acid number of ten or less was reached. At this time 50 gm of succinic anhydride was added and the batch was held at 145° C. until an acid number of 81 was reached. A final addition of 200.2 gm of the AZ Epoxy No. 8 ® was added and the batch held until an acid number of 1.8 was reached. The batch was then cooled to below about 100° C. and stored for later use. The resulting stabilizer solution had a solids content of 82% by weight.

EXAMPLE II

To a reaction flask equipped with an agitator, thermometer, condenser and a nitrogen inlet tube, 120 gm of ethylene glycol monoethyl ether acetate, 75.4 gm of 2-ethyl hexanol and 58 gm of succinic anhydride were added and the reaction mixture was heated to 130° C. and held until an acid number of about 133.6 is reached. At this time 145 gm of Cardura E (glycidyl ester of versatic acid) was added. The batch was held until an acid number of 13 or less was reched. At this time 58 gm of succinic anhydride was added and the batch was held at 145° C. until an acid number of 84 was reached. A final addition of 145 gm of the Cardura E was added and the batch held at temperature until an acid number of 8.3 was reached. The batch was then cooled to below 100° C. and stored for later use. The resulting stabilizer solution had a solids content of 79.5% by weight.

It has been determined that to optimize certain characteristics of the nonaqueous dispersion, that the stabilizers have a higher molecular weight than those which result from a single addition reaction of the commercially available acids and epoxides. Typically, stabilizers should have molecular weights (weight average) from about 500 to about 1300 while the preferred are about 800 to about 1100. This may be achieved by reacting the hydroxyl functional stabilizer resulting from the monoepoxide and carboxylic acid reaction with more cyclic anhydride to again produce a carboxylic acid which when reacted with more monoepoxide results in a larger molecular weight hydroxyl functional stabilizer. The cycle may be repeated any number of times until the desired molecular weight stabilizer is attained, such stabilizers will also have increased aliphatic properties which are desirable as it they increase the stability in nonpolar solvents.

The resulting stabilizer described above may then be reacted with polyols and diisocyanates to produce a urethane polymer which when dispersed in a solvent having a lower polarity than the urethane will result in the stable nonaqueous dispersion.

This reaction is a conventional urethane condensation reaction between the stabilizer, aliphatic polyols and diisocyanate.

Both the polyols and the diisocyanates which may be used are those typically used for making urethane resins.

The polyols may be aliphatic, cycloaliphatic, or branched aliphatic. Some typical ones which may be used are ethylene glycol, neo-pentyl glycol 1,4-butane diol, 1,6-hexane diol, cyclohexane dimethylol, trimethylol propane, trimethylol ethane, etc. Although a certain amount of aromaticity may be tolerated in the polyols it is not desirable as they are not ultraviolet durable and they would be less desirable where the finish is to be used in automobile coatings.

The diisocyanates may also be any of those commonly used in the manufacture of urethane resins. These are, again, aliphatic, cyclic aliphatic branched or straight chained, two examples of which are isophorone diisocyanate and dicylohexyl methane-4,4'-diisocyanate.

Typically, the reactants, the stabilizer, the diisocyanate and the polyols are placed in a reaction flask and are reacted under conventional polyurethane forming conditions. This means heating the reactors to about 75° C. to about 150° C. until about 98% or higher of diisocyanate has been reacted.

The reactants should be present in such a relationship that the stabilizer comprises about 8% to about 35% by weight where about 11% to about 13% by weight is preferred, the diisocyanate is present at about 15% to about 55% by weight with about 30% to about 45% by weight is preferred, and the balance is the polyols. It is important to the success of this reaction to maintain a ratio of $OH/_{NCO}$ (between the polyols and diisocyanate) of about 1.02 to about 1.5 and preferably about 1.4.

Although the nonaqueous dispersions of polyurethane copolymers may be used to prepare useful dispersions, it is preferred that the urethane copolymers have some amount of polyester polyurethane incorporated into them, to improve their stability, and thereby result in the best basecoat properties developed to date. This alternative nonaqueous dispersion will again use the same stabilizer as the polyurethane dispersions described above. However, instead of using the typical polyols to react with the diisocyanate, polyester diols are reacted with the stabilizer and the diisocyanate. Again these diisocyanates will be those described in the previous polyurethane system and the reaction conditions and procedures will be the same.

These polyester diols which may be used with this reaction are typically a reaction product of a diacid and a diol and should have molecular weights of about 500 to about 2000 with a preferred molecular weight range of about 600 to about 900. The reaction is conventional and two examples of the polyester diols follow:

EXAMPLE III

To a reaction flask equipped with an agitator, nitrogen inlet tube, thermometer and vigreaux fractionating column 513.65 gm of ethylene glycol and 1008.9 gm of adipic acid were charged. The batch was heated to about 145° C. at which time the esterification reaction started. The batch was heated and water was removed until an acid number of about 5 was reached at a corresponding temperature of about 244° C. The total water removed was about 242 gm. The resin was then cooled and resulted in a 100% nonvolatile solid mass with an equivalent weight of 618 gm per equivalent of hydroxyl.

EXAMPLE IV

To a reaction flask equipped with an agitator, thermocouple, nitrogen inlet tube and fractionating column 659 gm of neopentyl glycol, 393.5 gm of ethylene glycol and 1620 gm of adipic acid were charged. The reaction mixture was then heated to about 150° C. at which time the esterification reaction began. The heating continued and the water was removed from the reaction until the batch temperature reaches about 215° C. At this point the reaction batch was cooled to less than 100° C. The fractionating column was replaced with a barret trap and 84 gm of toluene was added to the reaction flask. The batch was then heated to 185° C. at which time the toluene and water begin to reflux and the water was removed. The batch was held at reflux until a total of 403 gm of water had been removed and the acid number was less than 5. The batch was cooled to 100° C. and 888 gm of N-butyl acetate was added to give a 70% nonvolatile solution of a polyester resin with an equivalent weight of 669 gm nonvolatile per equivalent of hydroxyl.

Typically, the proportion of reactants used to prepare the polyester polyurethane nonaqueous dispersion will be about 20–45% by weight of polyester diols, with about 30–40% by weight being preferred, about 8% to about 35% by weight of the stabilizer and about 15% by weight to about 45% of the diisocyanate. In addition to using only the polyester diols, polyols of the type described above may be added to complete the weight percent of the desired polyester diol reactants.

Again it is important that the equivalent ratio of $OH/_{NCO}$ in the reactants be from about 1.02 to about 1.5 with the preferred ratio being about 1.4.

The solvents in which the resultant urethane polymer or polyester urethane polymers are dispersed to form the nonaqueous dispersion, should have a polarity coefficient of less than that of the urethane or polyester urethane portion of the polymer. Typically, these will be ketones, acetates, aromatics, etc., such as methyl ethyl ketones, amyl acetate, and toluene. Once the particular polymer has been synthesized, it is dispersed in the solvents to form a nonaqueous dispersion. These particular nonaqueous dispersions are particularly adapted for use with base coat/clear coat finishes for the automobile industry. To prepare such coatings the particular nonaqueous dispersion is mixed with conventional base coat constituents such as color pigmentation, cross-linking agents, possibly aluminum particles, UV absorbers, etc. The mixture may then be diluted with an appropriate solvent to lower the viscosity to an acceptable level.

EXAMPLE V

A typical base coat formulation follows: 24.2 gm of an aluminum pigment, 0.63 gm of a UV absorber (Sandovar 3206, Sandoz Ltd.), 44.4 gm of a melamine cross-linking agent (RES-755 from Monsanto Industrial Chemicals Company, were mixed in a slurry in a solvent comprising 1.25 gm of N-butanol, 20 gm of N-butyl acetate and 5 gm of high flash aromatic naptha from Ashland Chemical Corp. To this was added a mixture of 84.7 gm of a polyester polyurethane nonaqueous dispersion, and 3.59 gm of an acid catalyst (p-toluene sulfuric acid) in 30 gm of N-butyl acetate and 5 gm of N-butanol. The entire mixture was then reduced with the N-butyl acetate to a viscosity of 21 seconds in a Fisher #2 cup for spraying onto the substrate.

Typically, these base coats which are applied to the substrate are sprayed on and are limited to a certain range of viscosities. The present nonaqueous dispersions of this invention allow for lower viscosities of the final base coat mixture with higher solids content, thereby requiring less solvent to dilute the mixture to the proper viscosity. In addition, these nonaqueous dispersions allow for a base coat mixture with lower viscosities yet have significantly higher solids contents. Typically these base coat mixtures will contain about 40% to about 45% solids content and still have the same viscosity as conventional base coat materials of the prior art, typically 30% to about 35%. Additionally, the base coats prepared using these polyurethane nonaqueous dispersions will result in a base coat having excellent rheology control, thereby not requiring the addition of rheology control agents which may deteriorate the quality of the base coat/clear coat finish.

EXAMPLE VI

To a reaction vessel equipped with an agitator, condensor and water trap, thermometer and a nitrogen inlet tube the following materials were added: 68 gm of polyester diol of Example III, 97.2 gm of the 70% solids polyester diol of Example IV, 48 gm of 1,6 hexane diol, 24 gram of trimethylol propane, 68 gm of the 82% NV solution of stabilizer of Example I, and 25 gm of toluene. The reaction mixture was heated to relfux 133° C. and any traces of water were removed from the mixture. The reaction mixture was cooled to 58° C. at which time 130.2 gm of toluene and 0.6 cc of benzyl dimethlylamine were added. The reaction mixture was cooled to 40° C. and 132.7 gm of isophorone diisocyanate were added over 15 minutes. The batch exothermed to 63° C. at which time heat was applied and the batch was heated to reflux at 121° C. The batch was held at reflux until the reaction was greater than 99% complete as determined by isocyanate analysis. The batch was then cooled to 52° C. and 17.2 gm of ethylene glycol monobutyl ether was added. The resulting polymer dispersion had a Gardner Holdt viscosity of Z-1 at 66% nonvolatile, at 25° C.

EXAMPLE VII

To a reaction vessel equipped with an agitator, condenser and water trap thermometer and a nitrogen inlet tube the following materials were added: 136 gm of polyester diol of Example III, 48 gm of 1,6 hexane diol, 24 gm of trimethylol propane, 70.4 gm of the 79.5% nonvolatile solution of stabilizer of Example II, and 25 gm of toluene. The reaction mixture was heated to reflux (135° C.) and any traces of water were removed from the mixture. The reaction mixture was cooled to 50° C. at which time 156.8 gm of toluene and 0.6 cc of benzyldimethylamine was added. The reaction mixture was cooled to 40° C. and 138 gm of isophorone diisocyanate were added over twenty minutes. The batch exothermed to 53° C. at which time heat was applied and the batch was raised to reflux at 115° C. The batch was held at reflux until the reaction was 98.8% complete as determined by isocyanate analysis. The batch was then cooled to 70° C. and 20.2 gm of ethylene glycol monobutyl ether was added. The resulting polymer dispersion had a Gardner Holdt viscosity of X-Y at 64.1% nonvolatile at 25° C.

It should be understood that the invention is not limited to the particular embodiments shown and described herein, but that various changes and modifications may be made without departing from the spirit and scope of this novel concept as defined by the following claims.

I claim:

1. A nonaqueous dispersion particularly adapted for use in automotive base coat/clear coat applications comprising:
a urethane copolymer dispersed throughout a solvent, said solvent being less polar than the urethane copolymer, wherein said urethane copolymer is the reaction product of a stabilizer, polyols, and diisocyanate, and said stabilizer is the reaction product of a carboxylic acid and a monoepoxide, said nonaqueous dispersion when used to produce automotive base coats results in a high solids, low viscosity base coat with good rheology control.

2. A method of making a nonaqueous dispersion for use in automotive base coat/clear coat applications comprising:
preparing a stabilizer by reacting a carboxylic acid with a monoepoxide;
reacting the stabilizer with polyols and diisocyanate to produce a urethane copolymer, dispersing the copolymer in a solvent having a polarity less than that of the copolymer to form a nonaqueous dispersion.

3. The dispersion of claim 1 wherein the urethane copolymer is a polyester polyurethane.

4. The method of claim 2 wherein the urethane copolymer is a polyester polyurethane.

* * * * *